United States Patent
Hand et al.

(10) Patent No.: US 11,609,350 B2
(45) Date of Patent: Mar. 21, 2023

(54) MODULAR SEISMIC UNIT STORAGE SYSTEM WITH GANTRY ROBOT AND CHARGING MAGAZINE

(71) Applicant: Magseis FF LLC, Houston, TX (US)

(72) Inventors: Sam Hand, Houston, TX (US); Michael Morris, Sugar Land, TX (US); Matthew Stubbe, Sugar Land, TX (US)

(73) Assignee: Magseis FF LLC, Houston, TX (US)

( * ) Notice: Subject to any disclaimer, the term of this patent is extended or adjusted under 35 U.S.C. 154(b) by 551 days.

(21) Appl. No.: 16/597,555

(22) Filed: Oct. 9, 2019

(65) Prior Publication Data

US 2020/0116886 A1    Apr. 16, 2020

Related U.S. Application Data

(60) Provisional application No. 62/745,106, filed on Oct. 12, 2018.

(51) Int. Cl.
*G01V 1/38* (2006.01)
*B63B 21/66* (2006.01)

(52) U.S. Cl.
CPC ............ *G01V 1/3808* (2013.01); *B63B 21/66* (2013.01); *G01V 1/3852* (2013.01); *G01V 2210/1423* (2013.01)

(58) Field of Classification Search
CPC ...................................................... B63H 25/04
See application file for complete search history.

(56) References Cited

U.S. PATENT DOCUMENTS

| | | | |
|---|---|---|---|
| 2005/0052951 A1* | 3/2005 | Ray | G01V 1/3808 367/188 |
| 2006/0159524 A1 | 7/2006 | Thompson et al. | |
| 2006/0243189 A1 | 11/2006 | Thompson et al. | |
| 2008/0080318 A1* | 4/2008 | Maxwell | H04B 11/00 367/131 |
| 2015/0331130 A1* | 11/2015 | Henman | G01V 1/3843 405/158 |
| 2016/0056645 A1* | 2/2016 | Henman | G01V 1/247 320/112 |
| 2016/0332525 A1* | 11/2016 | Kufner | B60L 53/30 |
| 2017/0203815 A1* | 7/2017 | Dudley | B63B 21/62 |

FOREIGN PATENT DOCUMENTS

WO    WO-2006/041438 A1    4/2006

OTHER PUBLICATIONS

International Preliminary Report on Patentability, Ch. I, for PCT Appln. Ser. No. PCT/US2019/055518 dated Apr. 22, 2021 (9 pages).
International Search Report and Written Opinion for PCT Appln. Ser. No. PCT/US2019/055518 dated Feb. 21, 2020 (15 pages).

* cited by examiner

*Primary Examiner* — Isam A Alsomiri
*Assistant Examiner* — Joseph C Fritchman
(74) *Attorney, Agent, or Firm* — Sage Patent Group

(57) ABSTRACT

A modular seismic unit storage and handling system with a gantry robot and charging magazine is provided. The storage and handling system can include a storage container. The storage and handling system can include a top hat and a top hat extension. The storage and handling system can include an automated connection and charging magazine. The top hat can be connected to a gantry robot. The gantry robot can include a robotic arm.

19 Claims, 14 Drawing Sheets

MODULAR SEISMIC UNIT STORAGE SYSTEM WITH GANTRY ROBOT AND CHARGING MAGAZINE

CROSS-REFERENCE TO RELATED APPLICATIONS

The present application claims the benefit of priority under 35 U.S.C. § 119(e) to U.S. Provisional Application No. 62/745,106 filed Oct. 12, 2018, the entire contents of which are incorporated herein by reference.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons. Performing seismic surveys to acquire seismic data require manual labor for many of the tasks associated with moving, storing, and charging seismic data acquisition units. There is also an increasing need for lower costs for survey data and larger receiver counts.

SUMMARY

The present disclosure is directed to systems and methods for the automated storing and charging of seismic data acquisition unit. Due to the large number of seismic data acquisition units (or receivers) that are used to collect seismic data, it can be challenging to efficiently store seismic data acquisition units, charge seismic data acquisition units, as well as retrieve data stored on the seismic data acquisition unit or otherwise connect with the seismic data acquisition unit. Inefficiencies related to maintaining seismic data acquisition units can result in improper or incomplete maintenance, or maintenance not being performed, which can damage the seismic data acquisition unit. Further, it can be challenging to move or transfer a system for storing seismic data acquisition units from one vessel to another vessel.

Systems and methods of the present technical solution can solve these and other problems associated with performing a seismic survey. For example, a system of the present technical solution can provide a storage container to store a high density of seismic data acquisition units. The storage container can be an efficient size and shape to promote modularity of an entire survey operation, which may use variable crew sizes and component configurations. The size of the storage container can be a standard sized shipping container, thereby supporting the modularity aspect of this system. The parts within the system can be designed to breakdown and fit into standard sized shipping containers which also support the modularity and efficiency aspect of this system.

For example, the modular system of the present technical solution can include a base system. The base system can include a top hat that a gantry robot can be attached to. The top hat can allow the stacking of either another storage and handling system or other equipment (like an ROV and LARS). The system can include one or more top hat extensions that can allow the gantry robot to extend its functional reach over additional containers. These additional containers can be unit storage containers or ACCM containers. The top hat extension can allow for a smaller footprint for those cases where additional gantry robots are not needed for increased performance in handling units.

At least one aspect is directed to a system to perform a seismic survey in an aqueous medium. The system can be referred to as a modular system. The system can include a storage and handling system. The system can include a storage container and an Automated Connection and Charging Magazine (ACCM) container. The storage and ACCM containers can be located on a back deck of a vessel. The storage and handling system can store a plurality of stacks of seismic data acquisition units. The system can include a top hat. The top hat can be located over the storage and ACCM containers. The top hat can provide structural support for the addition of a second level of a storage and handling system or other equipment such as a remotely operated vehicle (ROV) or autonomously operated vehicle (AOV) and corresponding launch and retrieval systems (LARs) for deploying seismic data acquisition units or seismic nodes. The automated connection and charging magazine can include a plurality of electronic ports. The system can include a gantry robot. The gantry robot can be connected to the top hat of the storage and handling system. The gantry robot can move, within a horizontal plane in the storage and handling system, in a first direction and a second direction perpendicular to the first direction. The system can include a top hat extension to allow the gantry robot movement to extend over a second set of containers. The system can include a robotic arm of the gantry. The robotic arm can move, in a vertical plane, to engage a first seismic data acquisition unit from the plurality of stacks of seismic data acquisition units at a first location in the storage and handling system, and move in the horizontal plane via the gantry robot to place the first seismic data acquisition unit at a second location in storage and handling system to connect the first seismic data acquisition unit to a first electronic port of the plurality electronic ports of the automated connection and charging magazine.

At least one aspect is directed to a method of performing a seismic survey in an aqueous medium. The method can include storing, by a storage and handling system located on a back deck of a vessel, a plurality of stacks of seismic data acquisition units. The method can include providing, by a top hat located in the storage and handling system, structural support for the addition of a second level of a storage and handling system or other equipment such as an ROV and associated LARs for deploying the seismic nodes. The method can include providing an automated connection and charging magazine provided within the storage and handling system, the automated connection and charging magazine comprising a plurality of electronic ports. The method can include providing a gantry robot connected to the top hat of the storage and handling system, the gantry robot to move, within a horizontal plane in the storage and handling system and via the top hat, in a first direction and a second direction perpendicular to the first direction. The method can include moving, by a robotic arm of the gantry robot to move, in a vertical plane, to engage a first seismic data acquisition unit from the plurality of stacks of seismic data acquisition units at a first location in the storage and handling system. The method can include moving, by the robotic arm, in the horizontal plane via the gantry robot to place the first seismic data acquisition unit at a second location in the storage and handling system to connect the first seismic data acquisition unit to a first electronic port of the plurality electronic ports of the automated connection and charging magazine.

The method can include the top hat extension wherein the top hat extension comprises one or more rails and the gantry robot connect to the top hat extension via the one or more rails. The method can comprise the top hat extension wherein the top hat extension includes one or more members extending from a first side of the storage and handling system to a second side of the storage and handling system. The method can comprise transporting, by a conveyor, a second seismic data acquisition unit towards an opening of the storage and handling system, engaging, by the robotic arm of the gantry robot, with the second seismic data acquisition unit on the conveyor, and placing, by the robotic arm, the second seismic data acquisition unit on a stack of seismic data acquisition units of the plurality of stacks of seismic data acquisition units. The method can include a plurality of stacks of seismic data acquisition units, wherein each of the plurality of stacks of seismic data acquisition units comprises a plurality of seismic data acquisition units stacked via cleat rings. The method can include a top hat extension that can be attached to the top hat to allow the gantry robot to access the plurality of containers. The method can comprise an automated connection and charging magazine, wherein the automated connection and charging magazine comprises a connection system comprising a mating connector, a spring to provide floating motion, an internal slide containing the mating connector, and a conical shade for initial mating.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The present disclosure is directed to systems and methods that improve operations related to performing a seismic survey. For example, systems and methods of the present disclosure can allow for efficient and automated storage, charging, and maintenance of seismic data acquisition units, thereby making strides towards a fully automated system to perform seismic surveys.

Figure 1:
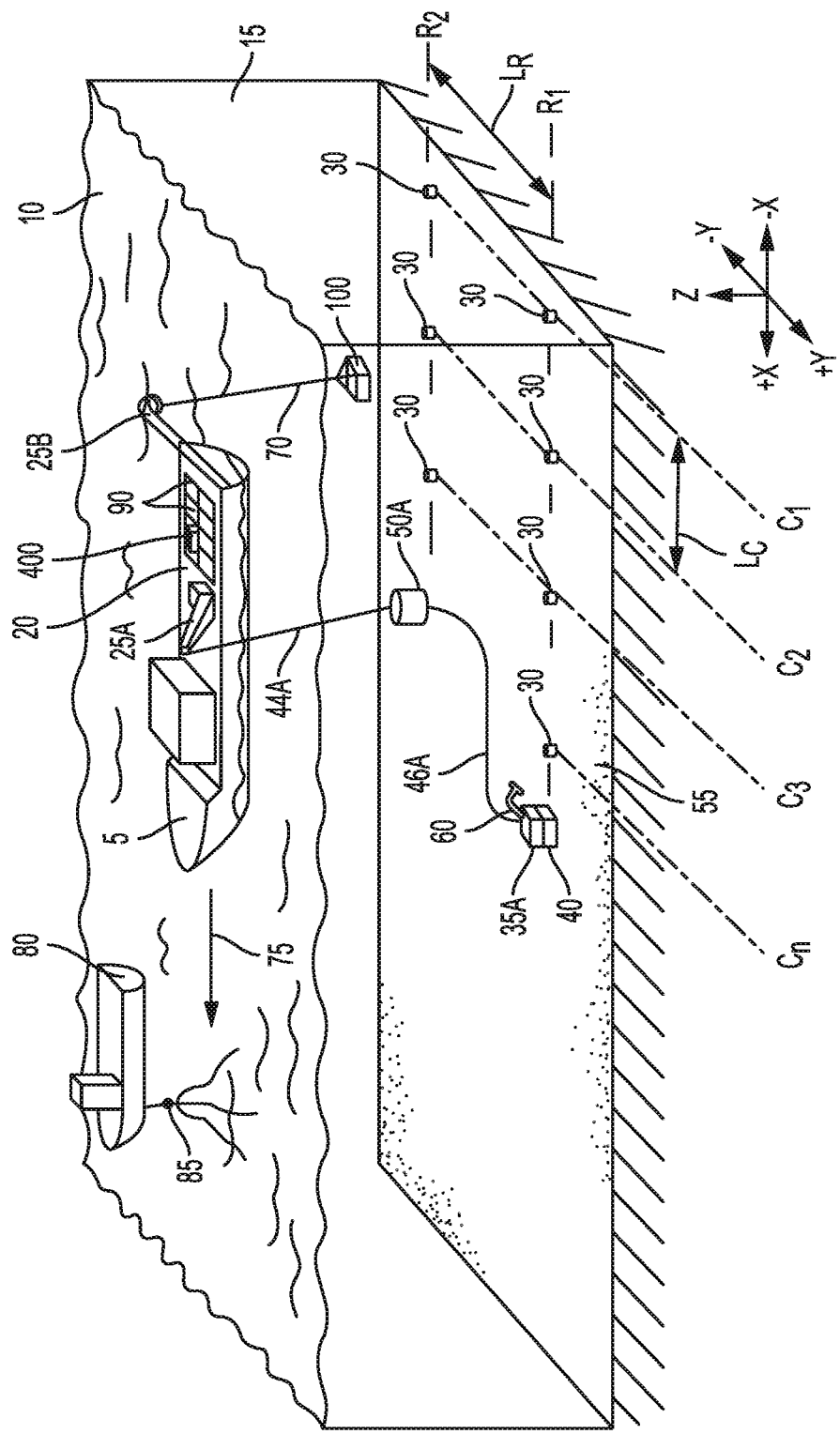
FIG. 1 depicts an isometric schematic view of an example of a seismic operation in deep water, in accordance with an implementation.

FIG. 1 is an isometric schematic view of an example of a seismic operation in deep water facilitated by a first vessel 5. FIG. 1 is a non-limiting illustrative example of a marine environment in which the systems and methods of the present disclosure can perform a seismic survey or calibrate a geophone and hydrophone pair.

By way of example, FIG. 1 illustrates a first vessel 5 positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices or sensor recharging devices. The vessel 5 can include electronics, such as shipside electronics, that can retrieve seismic data from seismic data acquisition unit 30, perform quality assessment, status checks, or charge a battery of the seismic data acquisition unit 30.

The deck 20 also includes one or more cranes 25A, 25B attached thereto to facilitate transfer of at least a portion of the operational equipment, such as seismic sensor devices (e.g., seismic data acquisition unit 30), from the deck 20 to the water column 15. For example, a crane 25A coupled to the deck 20 is configured to lower and raise an ROV 35A, which transfers and positions one or more sensor devices 30 (which can also be referred to as seismic data acquisition unit 30) on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 meters above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 (or seismic data acquisition unit 30) therein. The transfer device 100 may be a structure configured as a magazine adapted to house and transport one or more sensor devices 30. The transfer device 100 may include an on-board power supply, a motor or gearbox, or a propulsion system. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100. The transfer device 100 can include a subsea transfer device.

The ROV 35A can include a storage compartment 40 (e.g., seismic sensor device storage compartment, etc.) that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 (or seismic data acquisition unit 30; or seismic data acquisition unit 30 can include seismic sensor device 30) may be referred to as seismic data acquisition unit 30 or node 30. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer device 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device 85 (e.g., acoustic source device, etc.), which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use a ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 2:
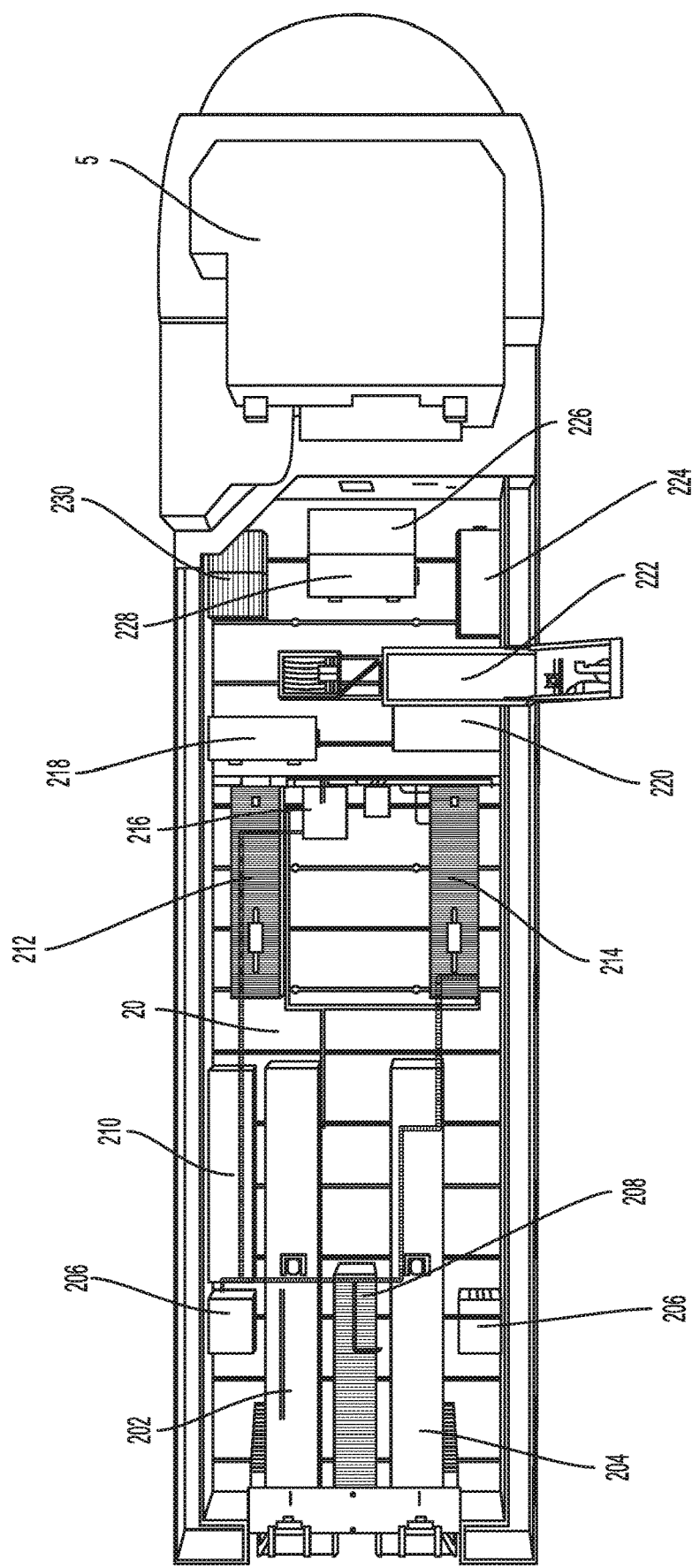
FIG. 2 depicts a top view of an example of a vessel, in accordance with an implementation.

FIG. 2 depicts a top view of an example of a first vessel 5. The vessel 5 can include on the deck 20 a number of modular containers to allow for variable configurations. The first vessel 5 can include a port side gun deployment unit 202 and a starboard side gun deployment unit 204. The port side gun deployment unit 202 and the starboard side gun deployment unit 204 may include devices capable of producing acoustical signals or vibrational signals suitable for obtaining survey data. The first vessel 5 can include a workshop container 208 that may be situated on the deck 20 and between the port side gun deployment unit 202 and the starboard side gun deployment unit 204.

The first vessel 5 can include on the deck 20 a modular system 220 for handling, charging, and storing nodes. This modular system 220 can house a plurality of seismic data acquisition units 30. The first vessel 5 can also include an electrical distribution container 210. The first vessel 5 can include a port side compressor 212 and a starboard side compressor 214. A compressor can be a high-pressure piston compressor system for air, natural gas, technical, and industrial gases. The first vessel 5 can include a fuel cell 216 to generate electricity. The first vessel 5 can also include a control van 218. The first vessel 5 can include a remotely operated underwater vehicle launch and recovery system (ROV LARS) 222. The ROV LARS may be located in a position on the deck 20 as to deploy an ROV. The first vessel 5 can include a storage container 206, PPE container 224, an office container 226, a work van 228, and a navigation department storage container 230.

Figure 3:
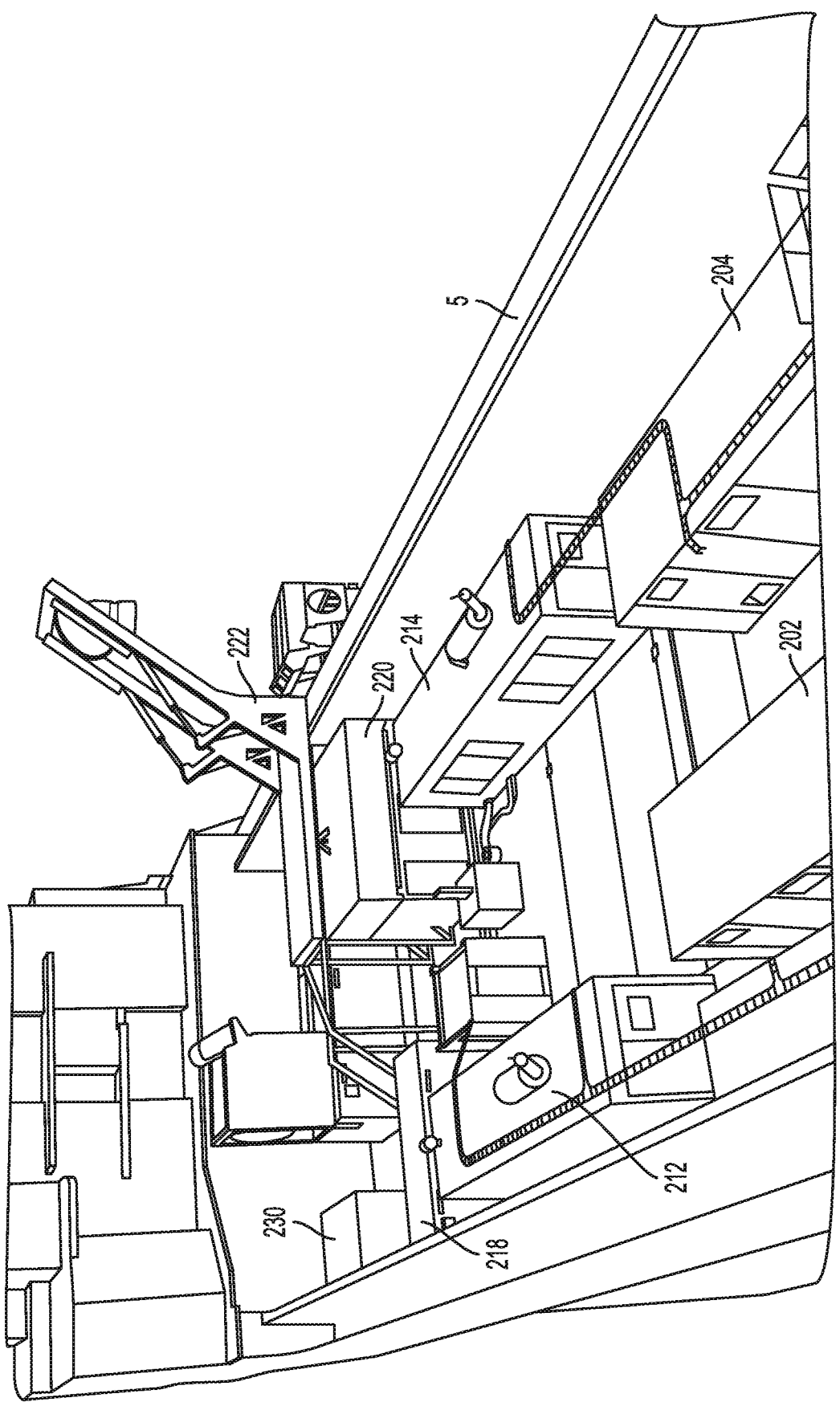
FIG. 3 depicts an illustration of an example of a vessel, in accordance with an implementation.

FIG. 3 depicts an illustration of an example of a first vessel 5. Shown in this figure are examples of components that can be located on the deck 20 of the first vessel 5. A port side gun deployment unit 202 and a starboard side gun deployment unit 204 can be positioned on the deck 20 of the first vessel. The first vessel 5 can also include a port side compressor 212 and a starboard side compressor 214. The first vessel 5 can also include a control van 218, a modular system 220 for handling, charging, and storing nodes, and a navigation department storage container 230. The first vessel 5 can also include an ROV LARS 222.

Figure 4A:
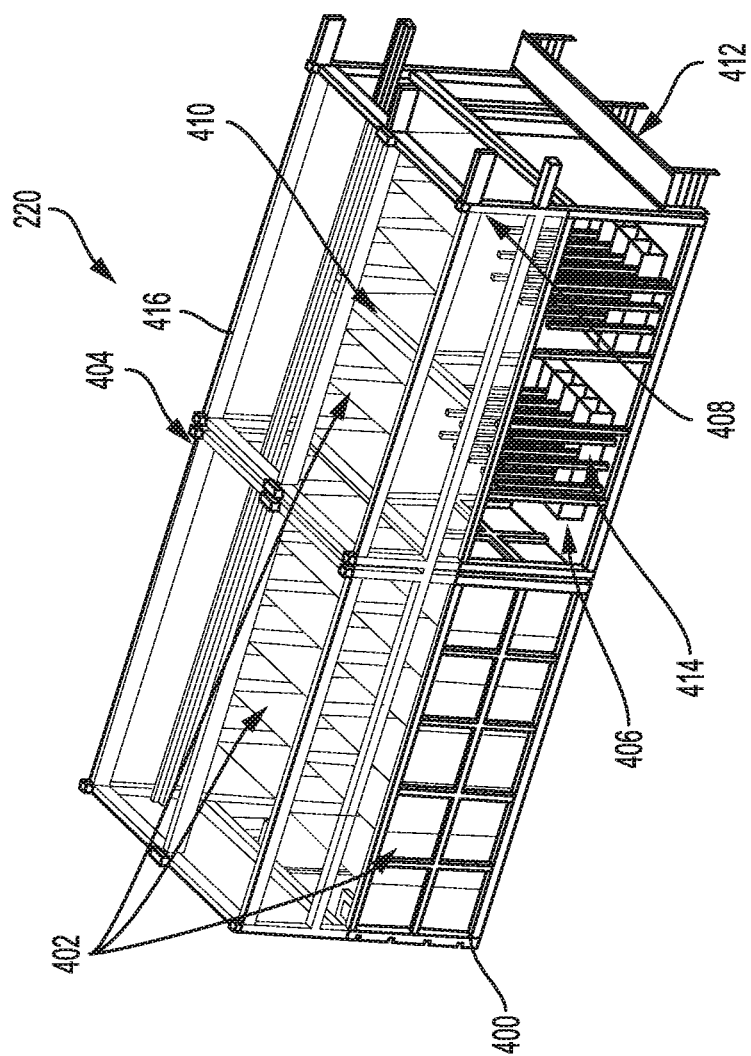
FIG. 4A depicts an illustration of a modular system, in accordance with an implementation.

FIG. 4A depicts an illustration of a modular system 220, in accordance with an implementation. The modular system 220 can have a storage and handling system 400. The storage and handling system 400 can be located on a deck 20 of a vessel 5. The storage and handling system 400 can house a plurality of stacks of seismic data acquisition units 30. The top hat 408 and top hat extension 404 can be located within the storage and handling system 400 on top of the storage containers 402 and ACCM containers 406. The top hat 408 and top hat extension 404 can provide structural support for the addition of a second level of a storage and handling system 400 or other equipment such as an ROV LARs 222 for deploying the seismic acquisition units 30. The top hat extension 404 can include one or more members 416 extending from a first side of the storage and handling system 400 to a second side of the storage and handling system 400. The top hat extension can be a part of the top hat 408 or separate from the top hat 408. The top hat 408 can be positioned within the storage and handling system 400 or on top of the storage and handling system 400. The storage and handling system 400 can have a storage container 402 to store seismic data acquisition units 30. The top hat extension 404 can be attached to the top hat 408. The top hat extension 404 can provide gantry robot access to the plurality of containers. In some embodiments, the top hat 408 and top hat extension 404 do not carry a load. For example, the storage and handling system 400 can include a sub-frame to provide structural support for the addition of a second level of a storage and handling system 400. The storage and handling system 400 can include a sub-frame to carry the load of a second level of a storage and handling system 400.

The storage and handling system 400 can include an automated connection and charging magazine (ACCM) container 406 (e.g., as depicted in FIGS. 4-5). The storage and handling system 400 can contain a second ACCM container 406 within the storage and handling system 400. The storage and handling system 400 can contain a second automated connection and charging magazine container 406 within the storage and handling system 400. An ACCM container 406 can house a plurality of automated connection and charging magazines 414. An ACCM 414 can be located inside the ACCM container 406 and can comprise a plurality of electronic ports.

The storage and handling system 400 can include a gantry robot 410. The gantry robot 410 can be connected to the top hat extension 404 on the storage and handling system 400. The gantry robot can move, within a horizontal plan in the storage and handling system 400 and via the top hat 408 and top hat extension 404, in a first direction and a second direction perpendicular to the first direction.

The storage and handling system 400 can include a conveyor 412. The conveyor 412 can transport a seismic data acquisition unit 30 towards an opening of the storage and handling system 400. The conveyor 412 can move seismic data acquisition units 30 into the storage and handling system 400. The conveyor 412 can move seismic data acquisition units 30 out of the storage and handling system 400. The conveyor 412 can include any type of conveyor, including, for example, a belt conveyor, powered conveyor, roller conveyor, gravity conveyor, or slide.

Figure 4B:
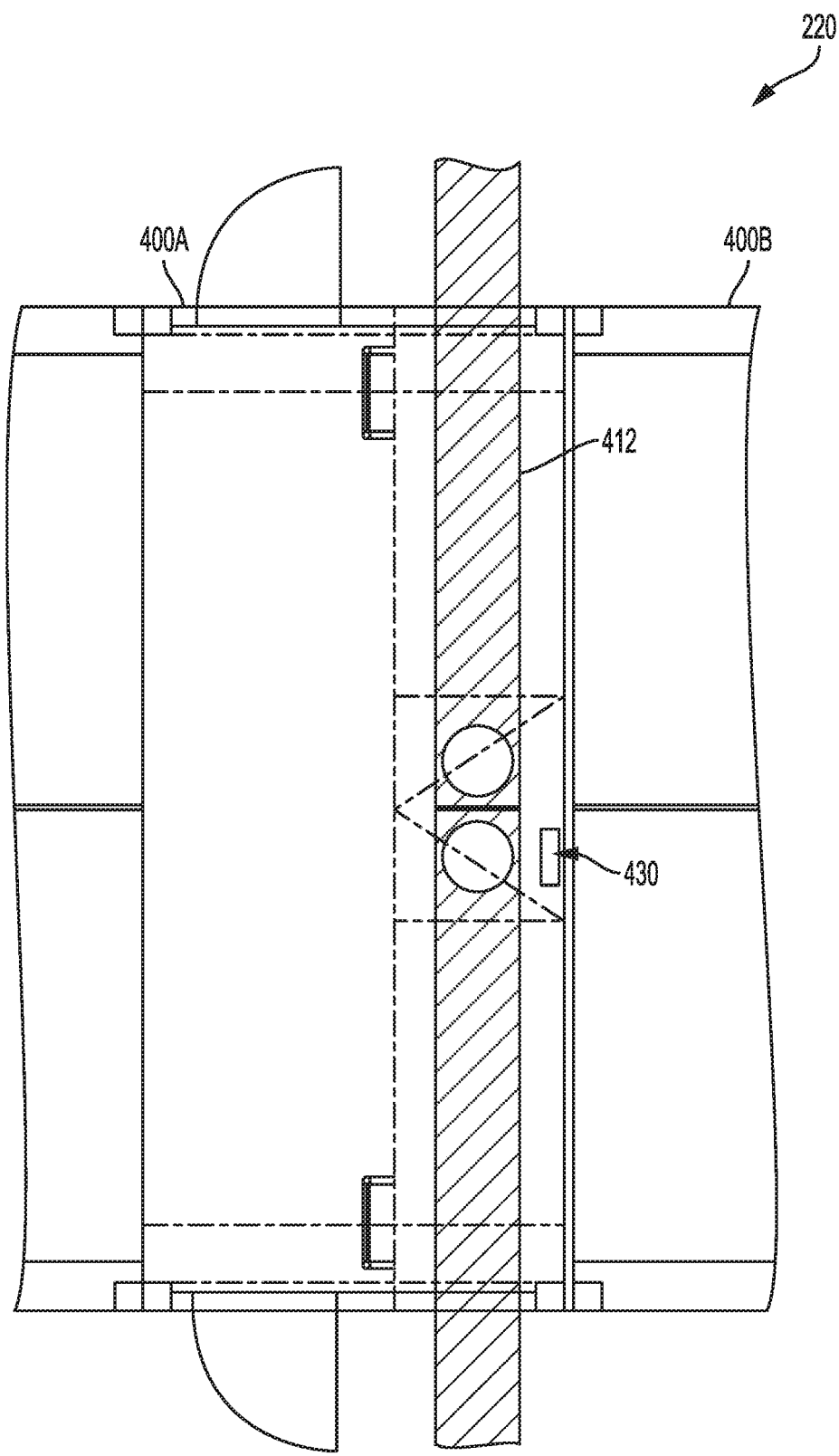
FIG. 4B depicts an illustration of a modular system, in accordance with an implementation.

FIG. 4B depicts an illustration of a modular system 220, in accordance with an implementation. The modular system 220 can have a storage and handling system 400. The storage and handling system 400 can include the conveyor 412. The conveyor 412 can be positioned between a first storage and handling system 400A and a second storage and handling system 400B. The storage and handling system 400 can include an onboarding sensor 430. The onboarding sensor 430 can detect seismic data acquisition units 30.

Figure 5A:
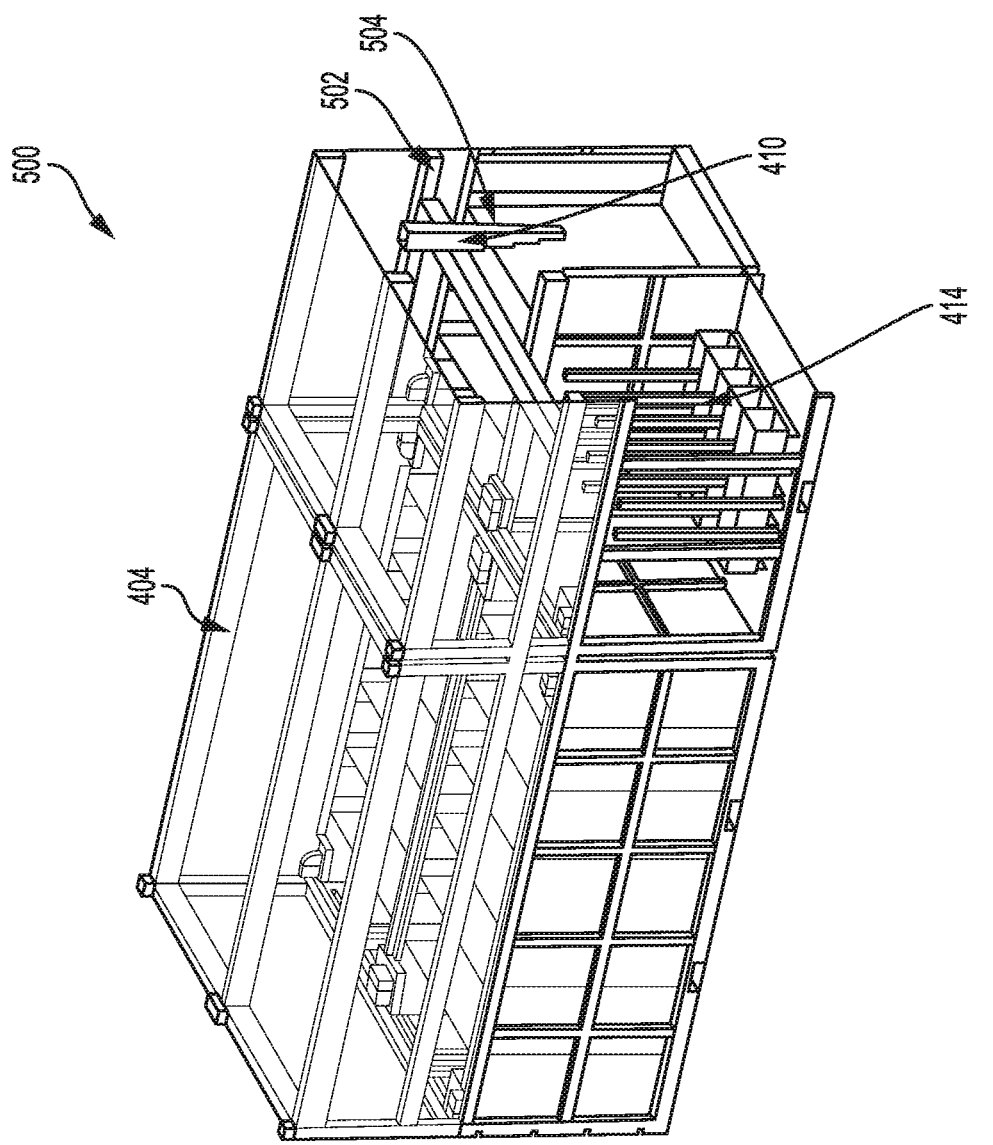
FIG. 5A depicts an illustration of a modular top hat and gantry robot system, in accordance with an implementation.

FIG. 5A depicts an illustration of a modular top hat and gantry robot system 500, in accordance with an implementation. The system 500 can include a top hat 408, a top hat extension 404, a plurality of ACCMs 414, a gantry robot 410, gantry robot rails 502, and a robotic arm 504. Gantry robot rails 502 can be a type of rails.

The modular top hat and gantry robot system 500 can include a robotic arm 504. The robotic arm 504 can be located on the gantry robot 410. The robotic arm 504 can move, in a vertical plane, to engage a first seismic data acquisition unit 30 from the plurality of stacks of seismic data acquisition units 30 at a first location on the storage and handling system 400 and move in the horizontal plane via the gantry robot 410 to place the first seismic data acquisition unit 30 at a second location in the storage and handling system 400 to connect the first seismic data acquisition unit 30 to a first electronic port 706 of the plurality of electronic ports of the ACCM 414. The robotic arm 504 of the gantry robot 410 can engage with a second seismic data acquisition unit 30 on the conveyor 412 and place the second seismic data acquisition unit 30 on a stack of seismic data acquisition units 30 of the plurality of seismic data acquisitions. The conveyor 412 can transport the second seismic data acquisition unit 30 towards an opening of the storage and handling system 400 and the robotic arm 504 of the gantry robot system 500 can engage with the second seismic data acquisition unit 30 on the conveyor 412 and place the second seismic data acquisition unit 30 on a seismic data acquisition unit stack 602 of the plurality of seismic data acquisitions.

Figure 12:
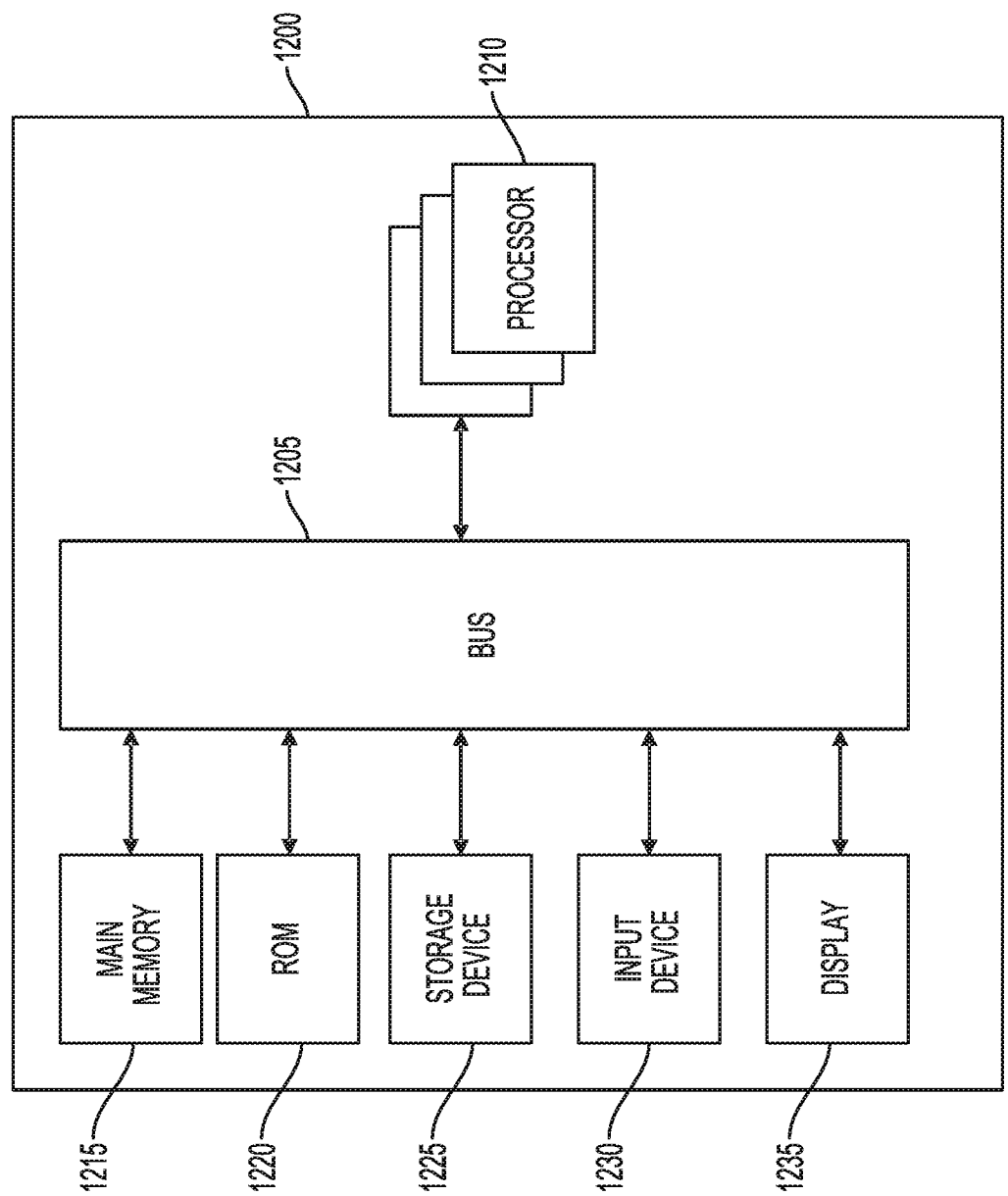
FIG. 12 depicts a block diagram of an architecture for a computing system employed to implement various elements of the systems or components depicted in FIGS. 1-11.

The robotic arm 504 can be operated by a computing system such as the one described in FIG. 12.

The gantry robot 410 (e.g., via robotic arm 504) can rotate the seismic data acquisition unit 30 so that the connection is facing a known direction that will allow proper mating to the connection ports of the ACCMs. The unit 30 can include a magnet imbedded in the cleat ring to allow the gantry robot 410 (or robotic arm 504) to sense a position on the unit 30 in order to reference the connector location on the unit 30, and then perform the desired rotation to align the connector on the unit 30 with the port on the ACCM.

The modular top hat and gantry robot system 500 can include gantry robot rails 502. The top hat extension 404 can comprise one or more rails, which can be gantry robot rails 502. The gantry robot 410 can be connected to the top hat extension 404 via the one or more rails, which can be gantry robot rails 502. The top hat extension 404, the ACCM 414, the gantry robot 410 and the robotic arm 504 can be configured to be in the storage and handling system 400.

Figure 5B:
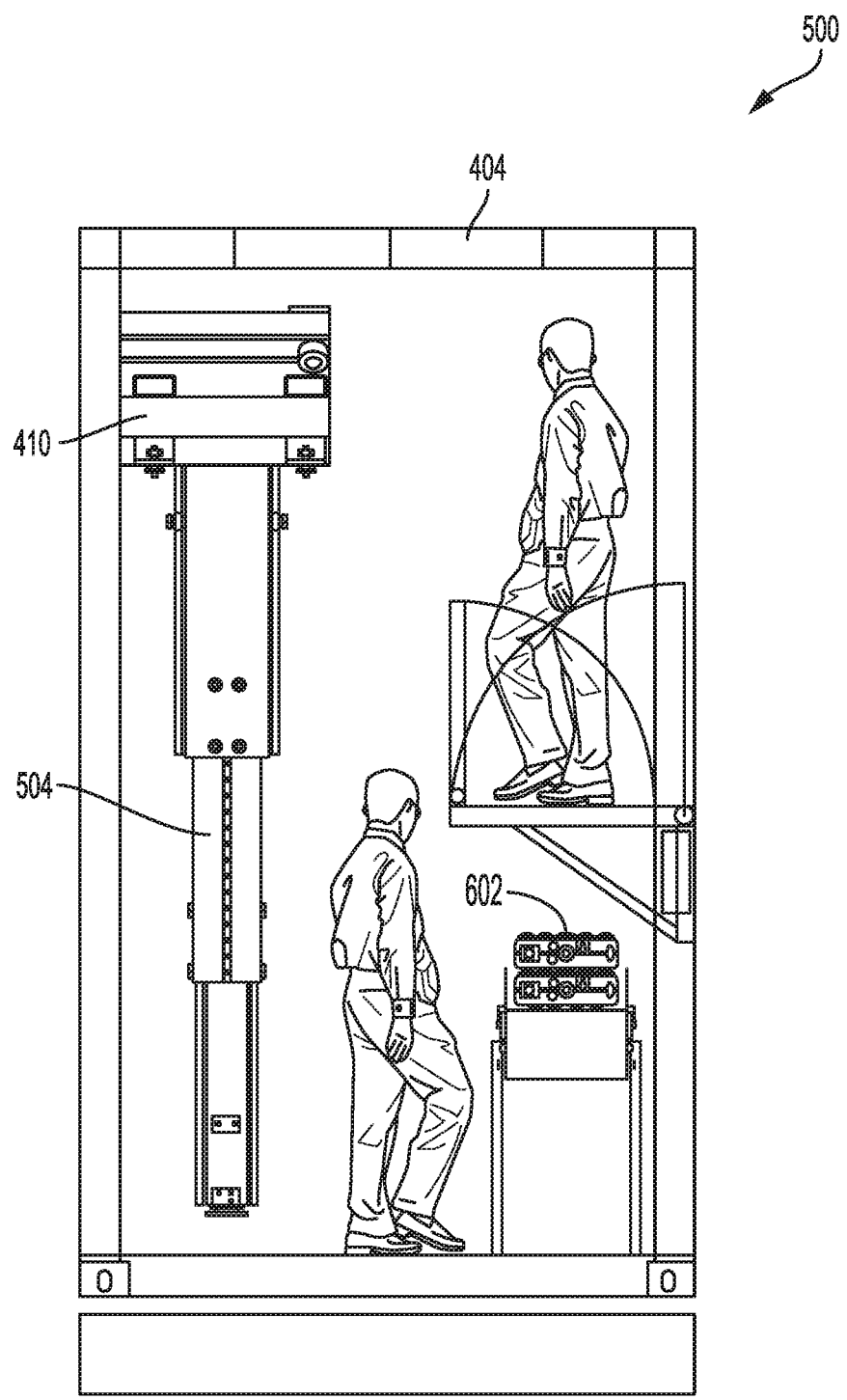
FIG. 5B depicts an illustration of a modular top hat and gantry robot system, in accordance with an implementation.

FIG. 5B depicts an illustration of a modular top hat and gantry robot system 500, in accordance with an implementation. The system 500 can include the top hat extension 404, the gantry robot 410, and the robotic arm 504. The system 500 can include a seismic data acquisition unit stack 602 as described herein.

Figure 6:
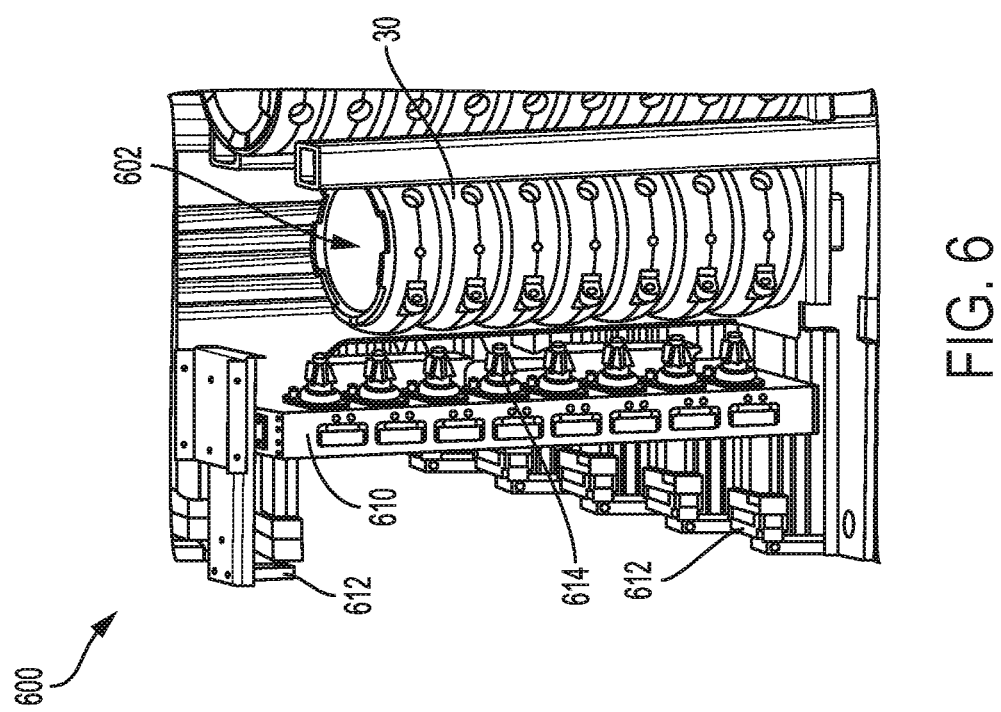
FIG. 6 depicts an illustration of automated connection and charging magazine system, in accordance with an implementation.

FIG. 6 depicts an illustration of an automated connection and charging magazine (ACCM) system 600, in accordance with an implementation. The ACCM system 600 can include a plurality of connection columns 610, a plurality of linear drive motors 612, a plurality of floated individual connections 614, and a seismic data acquisition unit stack 602. There can be a second ACCM system 600 provided within the storage and handling system 400.

The ACCM system 600 can include a plurality of connection columns 610. A connection column 610 can hold a plurality of floated individual connections 614. A connection column 610 can be located adjacent to a seismic data acquisition unit stack 602. A connection column 610 can hold a stack of eight seismic data acquisition units 30.

The ACCM system 600 can include a plurality of linear drive motors 612. A linear drive motor can be an electric motor that produce a linear force along its length. The linear drive motor can be a linear synchronous motor design with an active winding on one side of an air-gap and an array of alternate-pole magnets on the other side. A linear drive motor 612 can be located on top of a connection column 610. A linear drive motor 612 can also be located beneath a connection column 610. The ACCM system 600 can include a plurality of connection systems and a linear drive motor 612 to move the plurality of floated individual connections 614 to connect with a seismic data acquisition unit stack 602. A connection system can be comprised of a plurality of floated individual connections 614.

The ACCM system 600 can include a plurality of floating or floated individual connections 614. The floated individual connections 614 can be supported by a connection column 610. The floated individual connections 614 can couple to a seismic data acquisition unit 30. A collection of floated individual connections 614 located on a connection column 610 can couple to a seismic data acquisition unit stack 602. A plurality of floated individual connections 614 can also be a connection system.

The ACCM system 600 can include seismic data acquisition unit stack 602. The seismic data acquisition unit stack 602 can comprise a plurality of seismic data acquisition units 30 stacked via cleat rings. The ACCM 414 can charge a seismic data acquisition unit stack 602 of seismic data acquisition units 30. The seismic data acquisition unit stack 602 can include two or more seismic data acquisition units 30 stacked on one another via cleat rings. The seismic data acquisition unit stack 602 can include at least two seismic data acquisition units 30 stacked on one another via cleat rings. The ACCM 414 can comprise a plurality of floated individual connections 614 and a linear drive motor to move the plurality of connectors connect with a seismic data acquisition unit stack 602.

Figure 7:
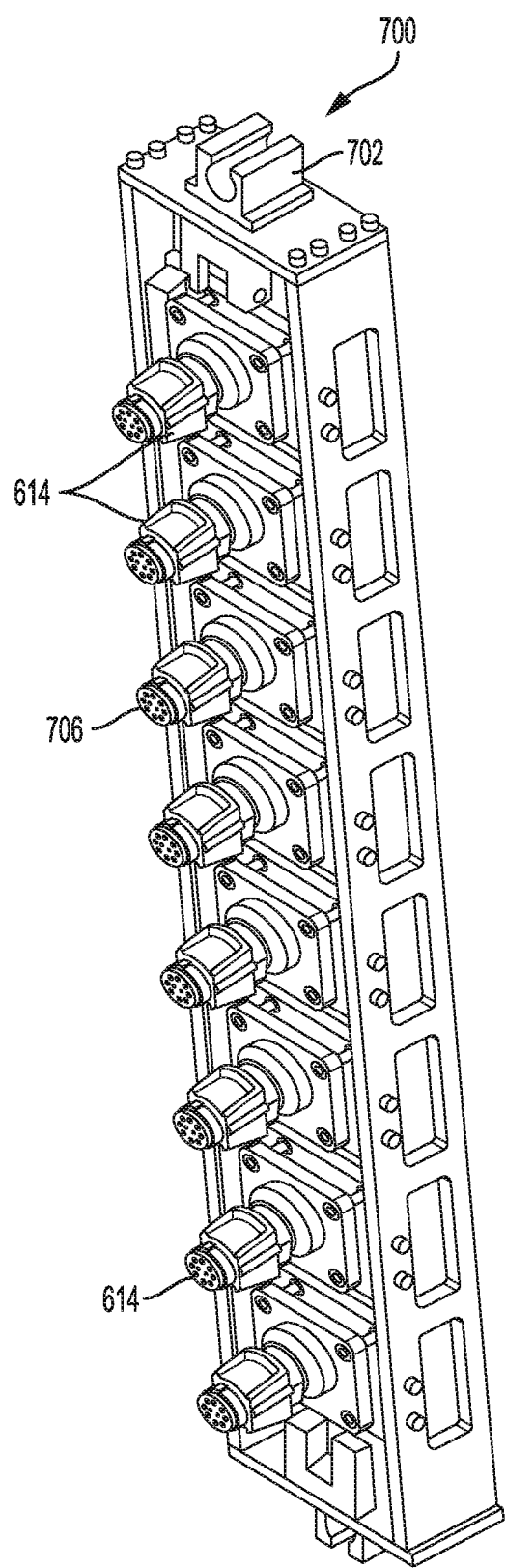
FIG. 7 depicts an illustration of a single column of connections of an automated connection system, in accordance with an implementation.

FIG. 7 depicts an illustration of a column 700 of connections of an automated connection system, in accordance with an implementation. A column 700 can include floated individual connections 614 and a slide 702. A column 700 can include a plurality of connection systems, each of the plurality of connection systems comprising a floating individual connection 614, a slide 702, and a plurality of linear drive motors 612 to move the plurality of connection systems via the slide 702 to connect with a seismic data acquisition unit stack 602. The floated individual connections 614 can couple to the seismic data acquisition units 30. The slide 702 can couple rails located on the ACCMs 414. The floated individual connections 614 can an electronic port 706. The electronic port 706 can couple to the seismic data acquisition units 30.

Figure 8:
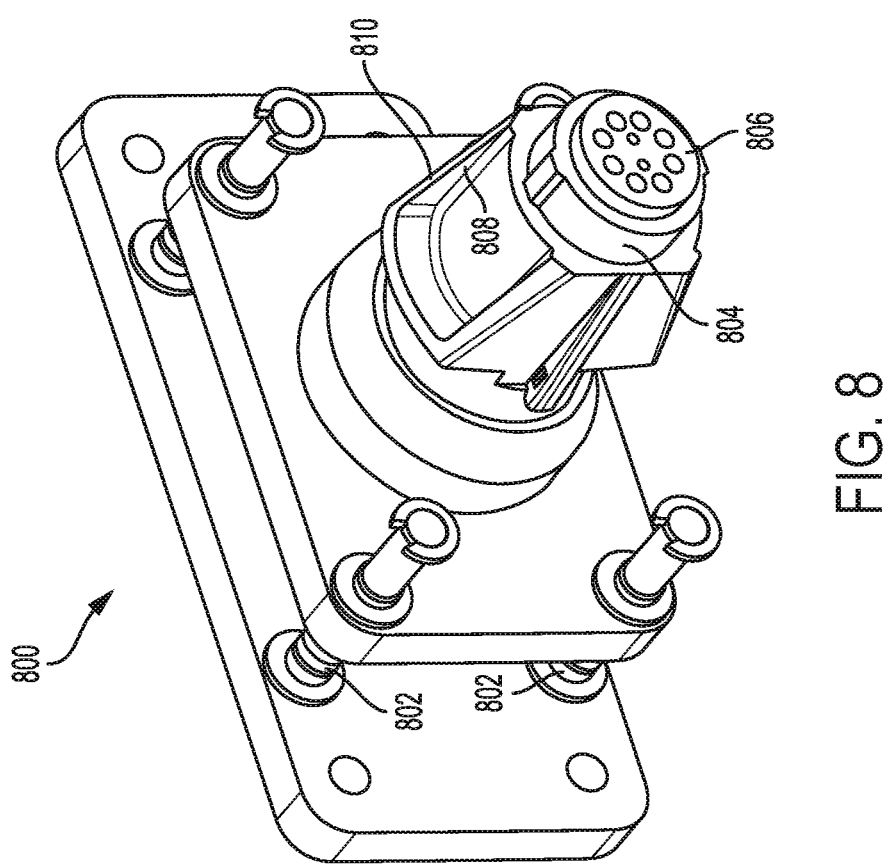
FIG. 8 depicts an illustration of a single unit of an automated connection system, in accordance with an implementation.

FIG. 8 depicts an illustration of a single unit connection system 800 of the automated connection and charging magazine 414, in accordance with an implementation. A unit connection system 800 can include a plurality of springs 802, an internal slide 804, a mating connector 806, and a conical shade 810. A unit connection system 800 can include a mating connector 806, a spring 802 to provide floating motion, an internal slide 804 containing the mating connector 806, and a conical shade 810 for initial mating.

The ACCM 414 can comprise a plurality of floated individual connections 614 (or connection systems) and a bumper 808 having a conical shape configured to guide the connection system to connect with the first seismic data acquisition unit 30. The ACCM 414 can comprise a plurality of connection systems, a plurality of bumper 808 having a conical shape configured to guide the plurality of connection systems to connect with a seismic data acquisition unit stack 602 and a linear drive motor 612 to move the plurality of connection systems to connect with the seismic data acquisition unit stack 602 via the plurality of bumpers 808.

The springs 802 can provide a floating motion to the system. It can be the case that the seismic data acquisition units 30 when placed in a seismic data acquisition unit stack 602 are not perfectly aligned but aligned within some degree of tolerance. The springs 802 can provide a degree of freedom to the system so that a stack that is not perfectly aligned can still couple to the mating connector 806. A unit connection system 800 can include a plurality of springs 802.

The internal slide 804 can contain the mating connector 806. The internal slide 804 can reveal itself as the mating connector 806 couples to a seismic data acquisition unit 30. The conical shade 810 can have conical shape around the mating connector 806 to help guide the mating connector 806 into alignment with the seismic data acquisition units 30.

Figure 9:
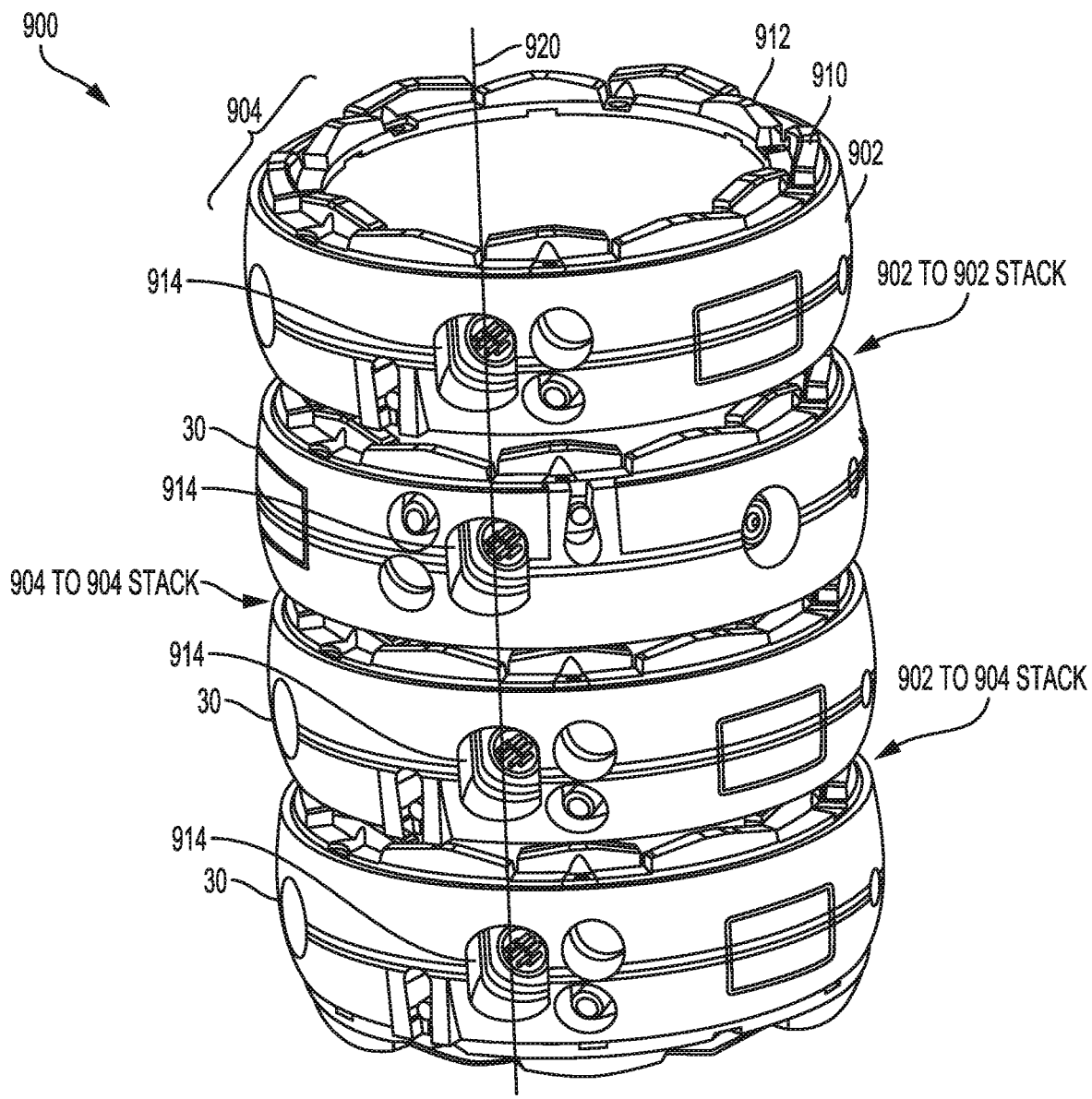
FIG. 9 depicts an illustration of a system to stack seismic data acquisition units, in accordance with an implementation.

FIG. 9 depicts an illustration of a system to stack seismic data acquisition units, in accordance with an implementation. The system 900 can allow for the storage and deployment of a larger number of seismic data acquisition unit 30, while reducing damage and inefficiencies. The system 900 can allow for orientation free stacking, reliable rotational alignment, automated connection to shipside electronics, high density unit storage, and inventory tracking and management.

The system can support automated connections by the seismic data acquisition unit 30 via features to control both the alignment between seismic data acquisition units 30 and the alignment of the connector 914 to the unit connection system 800 of the ACCM 414 on the ship. To support orientation free stacking and maintain the alignment of the connector 914 with the shipside electronic, a mating or cleat ring can be provided. The cleat ring can provide features to support orientation free stacking as well as features to facility the automation of this stacking. The cleat rings can also provide quality coupling or contact with the seabed for seismic data acquisition.

The high density storage of seismic data acquisition unit 30 allows the system 900 to increase the number of seismic data acquisition unit 30 that can be stored or deployed, and thereby used in a seismic survey. Seismic data acquisition unit 30 can be stacked in columns. To reduce the complexity of this stacking process, the seismic data acquisition unit 30 can be configured with cleat rings that provide interlocking of the seismic data acquisition unit 30 to be independent of orientation and tolerant of errors in rotational alignment.

The system 900 can include multiple seismic data acquisition unit 30. The cleats 910 and 912 can form a cleat ring that includes inner cleats 912 and outer cleats 910. The cleats 910 and 912 can be offset from one another such that the cleats 910 and 912 do not overlap or do not substantially overlap (e.g., not more than 1%, 2% 5%, 10%, 15%, 20%, 30%, 50%, or 60%). For example, the cleats 910 and 912 can be staggered with one another. The cleat ring with staggered outer cleats 910 and inner cleats 912 can facilitate stacking the seismic data acquisition units 30 on top of each other. For example, top side 902 of a first seismic data acquisition unit 30 can be stacked with the top side 902 of a second seismic data acquisition unit 30. The bottom side 904 of a seismic data acquisition unit 30 can be stacked with a bottom side 904 of another seismic data acquisition unit 30. And a top side 902 of a seismic data acquisition unit 30 can be stacked with a bottom side 904 of another seismic data acquisition unit 30. The seismic data acquisition unit 30 can be stacked such that the cleat ring of a first seismic data acquisition unit 30 is in contact with a cleat ring of the second seismic data acquisition unit 30. The cleat rings of the respective seismic data acquisition unit 30 can interlock one another in order to provide a secure stacking of seismic data acquisition unit 30.

The seismic data acquisition unit 30 can be stacked such that they are symmetrical or lined up along axis 920. By lining up the stack of seismic data acquisition unit 30 along axis 920, the connectors 914 of each seismic data acquisition unit 30 can also be in alignment, thereby facilitating the connection of the seismic data acquisition unit 30 internal electronics to shipside electronics. Further, the angle of the cleats 910 or 912, spacing, width, length and material can be configured or selected to facilitate stacking two or more seismic data acquisition unit 30.

Figure 10:
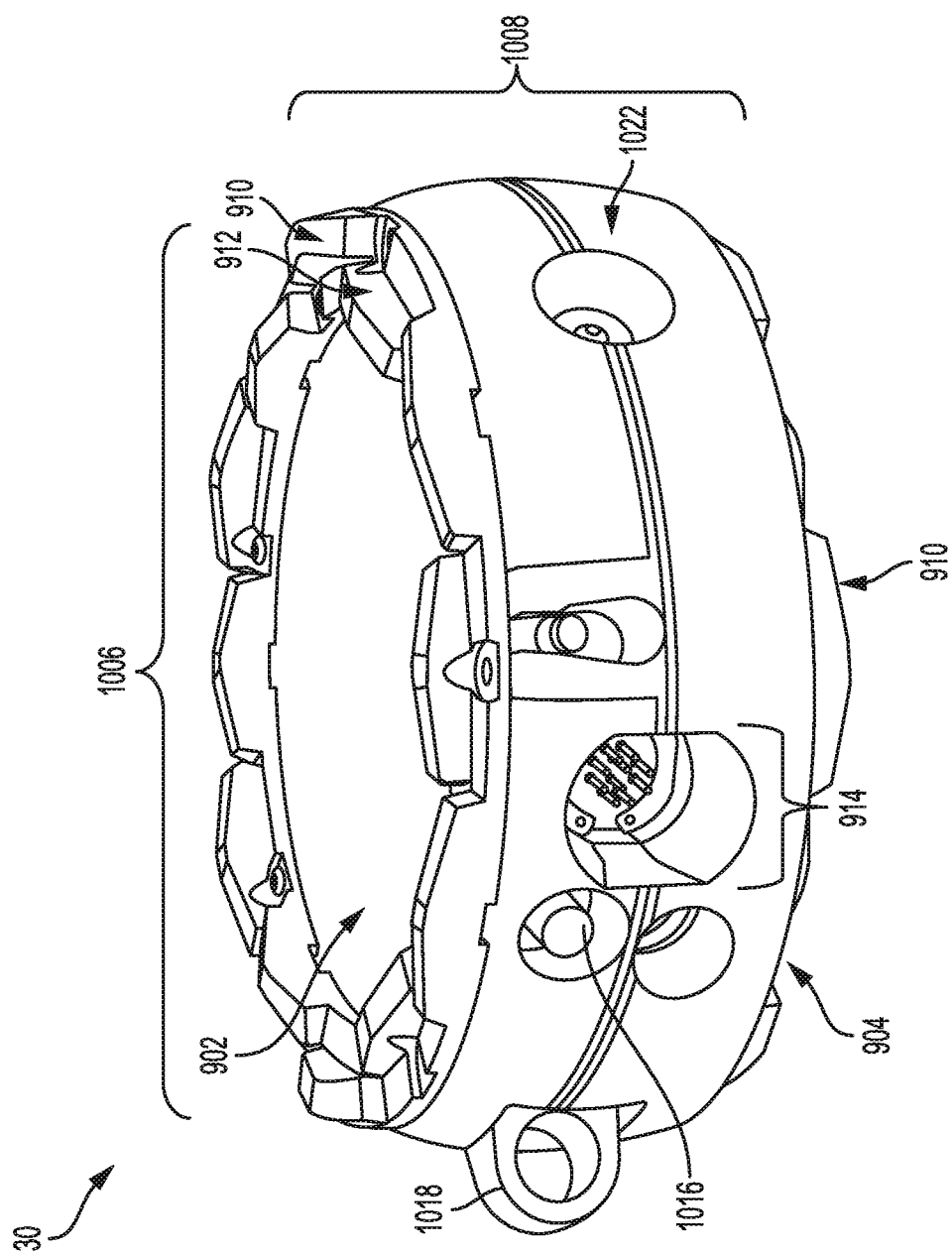
FIG. 10 depicts an illustration of a seismic data acquisition unit, in accordance with an implementation.

FIG. 10 depicts an illustration of a seismic data acquisition unit, in accordance with an implementation. The system can include the seismic data acquisition unit 30. The seismic data acquisition unit 30 can include a connector 914, such as cap free sub-sea connector, on the seismic data acquisition unit 30 that provides both maintenance and time efficiencies to operations related to performing a seismic survey. The connector 914 can function without a protective pressure cap, minimize or eliminate maintenance, be field repairable, and support connection automation. The connector 914 can be positioned on a portion of the seismic data acquisition unit 30. The connector 914 can be placed on side 1022 of the seismic data acquisition unit 30. The side 1022 of the seismic data acquisition unit can be on a different plane as the top side (e.g., first side 902) or bottom side (e.g., second side 904). For example, the side 1022 can be perpendicular (or substantially perpendicular such as 60 to 120 degrees) to at least one of the first side 902 o the second side 904.

The seismic data acquisition unit 30 can have a first side 902. The first side 902 can be referred to as a top side. The seismic data acquisition unit can have a second side 904, which can be referred to as a bottom side. The seismic data acquisition unit 30 can be disk shaped. For example, the seismic data acquisition unit 30 can have a width or diameter 1006 that is greater than a height 1008. For example, the diameter 1006 (or width) can range from 10 inches to 30 inches. The height can range from 5 inches to 20 inches. In some cases, the diameter can be less than or equal to 20 inches, and the height can be less than or equal to 10 inches. For example, a configuration of the seismic data acquisition unit 30 can include a diameter of 19.9 inches and a height of 10 inches; a diameter of 21 inches and a height of 10.5 inches; a diameter of 12 inches and a height of 4 inches; or a diameter of 17 inches and a height of 6 inches, for example. The seismic data acquisition unit 30 can be circular, rectangular, oval, octagonal, pentagonal, polygonal, or have another shape that facilitates seismic data acquisition.

The seismic data acquisition unit 30 can include first cleats 910 and second cleats 912. The first cleats 910 can form a first cleat ring, and the second cleats 912 can form a second cleat ring. First cleats 910 can be referred to as outer cleats, and second cleats 912 can be referred to as inner cleats. The outer cleats can be positioned on a perimeter of the seismic data acquisition unit 30, while the inner cleats can be form an inner cleat ring adjacent or proximate to the outer cleats. The first and second cleat rings can be coupled to the first side 902 of the seismic data acquisition unit 30. The first and second cleat rings can be coupled to the second side 904 of the seismic data acquisition unit 30. The cleats 910 and 912 can be positioned such that they do not overlap.

The seismic data acquisition unit 30 can include a coupling mechanism 1018. The coupling mechanism 1018 can include a component configured to facilitate coupling the seismic data acquisition unit 30 or facilitate deployment or storage of the seismic data acquisition unit 30. For example, the coupling mechanism 1018 can include a ring through which a cable (e.g., cable 44A or cable 70 depicted in FIG. 1) can be inserted in order to facilitate deploying the seismic data acquisition unit 30.

The seismic data acquisition unit 30 can include a transceiver 1016. The transceiver 1016 can include a transmitter or a receiver. The transceiver 1016 can include a transducer. The transceiver 1016 can transmit or receive acoustic signals or radio frequency signals. The transceiver 1016 can include a beacon. The transceiver 1016 can facilitate location detection, positioning, or the transmission of information related to seismic operations, such as seismic data, status information, or quality assessment.

Figure 11:
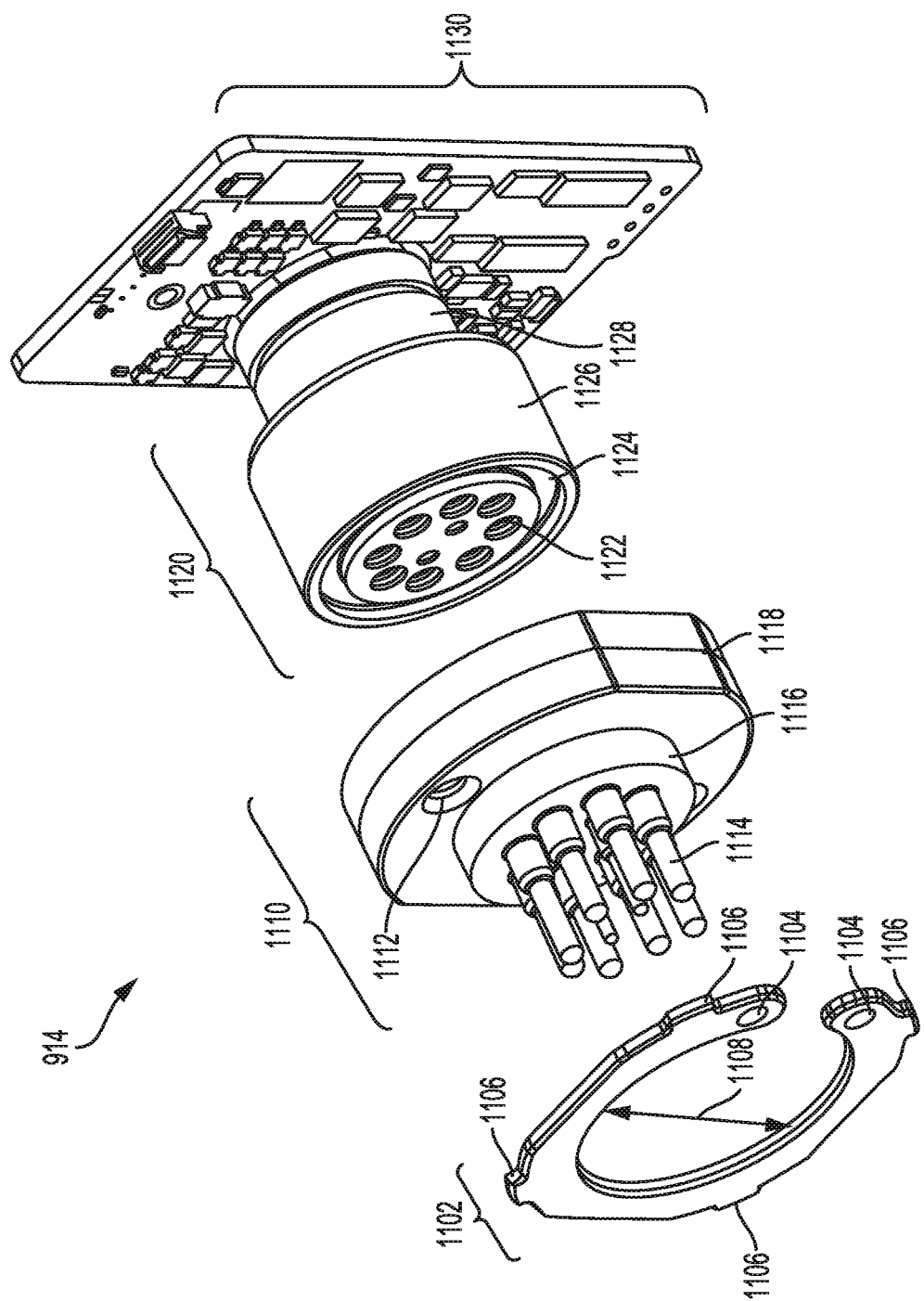
FIG. 11 depicts an illustration of a connector of a seismic data acquisition unit, in accordance with an implementation.

FIG. 11 depicts an illustration of a connector of a seismic data acquisition unit, in accordance with an implementation. The connector 914, or cap free subsea connector, can be illustrated as three components, such as a snap ring 1102, pin interconnect 1110 and socket insert 1120. The socket insert 1120 can be coupled to, or in contact with, isolation electronics 1130. Isolation electronics 1130 can include electronic circuitry, circuits, digital components, a printed circuit board, or other electronics. The socket insert 1120 can be depth rated, for example for subsea depths that are at or near the ocean floor or seabed. The pin interconnect 1110 can be field replaceable.

The connector 914 can be designed and constructed to be cap free, thereby reducing the amount of space the seismic data acquisition unit 30 occupies, either in a storage container or transfer container. Removing the cap can also allow for easier access to the electronic circuitry and allow an electrical communication to be established faster and more easily.

The connector is further designed and constructed to allow the pins 1114 to be replaceable. In some cases, the pins 1114 can be field replaceable. To achieve this, the connector 914 can be divided into two parts, the pin interconnect 1110 and the socket insert 1120. The socket insert 1120 can provide a satisfactory pressure rating for the operational depth requirements (e.g., ocean seabed) of the seismic data acquisition unit 30, and thus protect the internal electronics and stored survey data. The pin interconnect 1110 can connect the seismic data acquisition unit 30 electronics to the shipside electronics for functions (e.g., seismic data retrieval, quality assessment, or status checks) and provide a field replaceable component if the contacts (e.g., pins 1114) are damaged. Field replacement of the pin interconnect 1110 can be achieved by the removal of the snap ring 1102, cleaning the face seal 1118, and installing a new seal (e.g., seal 1118) and pin interconnect 1110. The connector 914 can be designed to be symmetric about the horizontal axis through the center two contacts. This design can allow for the shipside connection to be made in either of two orientations 180° apart thus facilitating back deck automation goals.

The snap ring 1102 can be formed of plastic or any other material that facilitates holding the pin interconnect in place in subsea pressure and sea water. The snap ring 1102 can be popped or placed into a groove on the housing of the seismic data acquisition unit 30. The snap ring 1102 can be shaped as a ring, horseshoe design or other shape. The snap ring 1102 can include protrusions 1106 that can facilitate holding or locking the snap ring into place in the seismic data acquisition unit 30, or housing thereof. The snap ring 1102 can have a diameter 1108 (e.g., a portion of the snap ring can have a width), that can range from 0.05 inches to 10 inches or more.

The snap ring 1102 can include openings 1104 configured to lock the snap ring 1102 in place. The openings 1104 can facilitate removing the snap ring 1102, for example via insertion of a removal tool into opening 1104. The opening 1104 can be threaded.

The pin interconnect 1110 can include a seal 1118. The pin interconnect 1110 can include a rubber boot 1116. In a marine environment, water can be present causing electric shorting between the pins 1114. To prevent this, a rubber boot 1116 present on both the pin interconnect 1110 and the shipside mating connector to "squeeze" off or dispel the water as the connecting is made and prevent the shorting of the contacts. The rubber boot 1116 can provide a cushion for a cable that connects to the pins 1114. The rubber boot 1116 can dampen the force that results from the cable connecting or physically engaging or mating with the pins 1114. The rubber boot 1116 can be formed of rubber or other material that can deform responsive to physical force or contact, and absorb the impact force or attenuate the impact force to protect the isolation electronics 1130 or other components of the seismic data acquisition unit 30.

The pin interconnect can include a plurality of pins 1114. The pins 1114 can be gold plated or coated with other types of metals, materials, polymers that can improve the longevity of the pins. The pins 1114 can be coated with a material that mitigates corrosion. However, since the pins 1114 may corrode even with such material, the pins 1114 can be replaced. The pin interconnect 1110 can be replaceable and be referred to as a sacrificial portion of the connector 914 because the pin interconnect 1110, or portion thereof, can be replaced upon corrosion or damage to a portion thereof.

The pin interconnect 1110 can include an opening 1112. The opening 1112 can be a removal tool insert. The opening 1112 can be threaded. The opening 1112 can facilitate the replacement of the pin interconnect 1110. For example, a removal tool, such as a threaded cylinder or screw, can be inserted into opening 1112. While the tool is inserted or threaded in opening 1112, the tool can detach the pin interconnect from the socket insert 1120.

The socket insert 1120 can be coupled to, or in contact with, the isolation electronics 1130. The pin interconnect can be coupled to, or in contact with, the socket insert 1120. The pin interconnect 1110 can be removably coupled to, or in contact with, the socket insert 1120. The snap ring 1102 can be coupled to, or in contact with, the pin interconnect 1110. The snap ring can be removably coupled to the pin interconnect 1110.

The socket insert 1120 can include a plurality of sockets 1122. The sockets 1122 can be surrounded by a socket o-ring groove 1124 in which an o-ring can be placed in order to facilitate providing a pressure and water seal. The o-ring groove 1124, in which an o-ring can be placed, can facilitate the prevention of water from contacting the isolation electronics 1130.

The socket insert 1120 can include a seal surface 1126. The socket insert can include a surface 1128. The portion of the socket insert 1120 can be wider or having a greater diameter as compared to the portion 1128 of the socket insert 1120. For example, the socket insert 1120 can taper from o-ring groove 1124 to surface 1128, where the o-ring groove 1124 is closer to the isolation electronics 1130 as compared to surface 1128, which can be closer to the pin interconnect 1110.

The isolation electronics 1130 can allow the pins 1114 or contacts to be exposed to the salt water environment and not have premature corrosion by electrically isolating the pins 1114 from electronics in the seismic data acquisition unit 30 so as to create a zero or near zero (e.g., 10 millivolts, 1 millivolt, 0.1 millivolt, 0.01 millivolt, 0.001 millivolt, 0.0001 millivolt, 0.00001 millivolt or less) electrical potential between themselves and the outside environment. Without this isolation, the contacts may create a circuit through which current would flow and erode the pins 1114 or contacts. By design, the pins 1114 can be isolated from each other by the insert material.

Since the function of the connector 914 is to allow the shipside electronics to have electrical connectivity to the electronics inside the seismic data acquisition unit 30, the isolation circuit 1130 can be configured to both isolates the pins 1114 and connect the pins 1114 when appropriate.

FIG. 12 depicts a block diagram of an architecture for a computing system employed to implement various elements of the systems or components depicted in FIGS. 1-11. FIG. 12 is a block diagram of a data processing system including a computer system 1200 in accordance with an embodiment. The computer system can include or execute a coherency filter component. The data processing system, computer system or computing device 1200 can be used to implement one or more component configured to filter, translate, transform, generate, analyze, or otherwise process the data or signals depicted in FIGS. 1-11. The computing system 1200 includes a bus 1205 or other communication component for communicating information and a processor 1210*a-n* or processing circuit coupled to the bus 1205 for processing information. The computing system 1200 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1210. Main memory 1215 can also be used for storing seismic data, binning function data, images, reports, tuning parameters, executable code, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235 or display device, such as a liquid crystal display, or active matrix display, for displaying information to a user. An input device 1230, such as a keyboard including alphanumeric and other keys, may be coupled to the bus 1205 for communicating information and command selections to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In some embodiments, hard-wired circuitry may be used in place of or in combination with software instructions to effect illustrative implementations. Thus, embodiments are not limited to any specific combination of hardware circuitry and software.

Although an example computing system has been described in FIG. 12, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to perform a seismic survey in an aqueous medium, comprising:
    a storage and handling system located on a back deck of a vessel, the storage and handling system containing a plurality of containers to store a plurality of stacks of seismic data acquisition units;
    a top hat structure located on the storage and handling system, wherein the top hat structure comprises one or more rails;
    an automated connection and charging magazine provided within the storage and handling system, the automated connection and charging magazine comprising a plurality of electronic ports, wherein the one or more rails are located over the storage and handling system and over the automated connection and charging magazine;
    a gantry robot connected to the top hat structure, via the one or more rails, on the storage and handling system, the gantry robot to move, within a horizontal plane and via the top hat structure, in a first direction and a second direction perpendicular to the first direction; and
    a robotic arm of the gantry robot to move, in a vertical plane, to engage a first seismic data acquisition unit from the plurality of stacks of seismic data acquisition units at a first location in the storage and handling system, and move in the horizontal plane via the gantry robot to place the first seismic data acquisition unit at a second location in the storage and handling system to connect the first seismic data acquisition unit to a first electronic port of the plurality of electronic ports of the automated connection and charging magazine, wherein the automated connection and charging magazine further comprising at least one connection column that includes:
    a plurality of connection systems;
    a slide on the plurality of connection systems, wherein the slide is coupled to the one or more rails located over the automated connection and charging magazine; and
    a plurality of linear drive motors, wherein the plurality of linear driver motors is further configured to move, via the slide, the plurality of connection systems to connect with a stack of seismic data acquisition units of the plurality of stacks of seismic data acquisition units.

2. The system of claim 1, comprising:
    the top hat structure to provide structural support for an addition of a second level of the storage and handling system or other equipment such as an underwater vehicle and a corresponding launch and retrieval system for deploying the seismic data acquisition units and the top hat structure.

3. The system of claim 1, wherein the top hat structure includes one or more members extending from a first side of the storage and handling system to a second side of the storage and handling system.

4. The system of claim 1, comprising:
    a conveyor to transport a second seismic data acquisition unit towards an opening of the storage and handling system; and
    the robotic arm of the gantry robot to engage with the second seismic data acquisition unit on the conveyor and to place the second seismic data acquisition unit on a stack of seismic data acquisition units of the plurality of stacks of seismic data acquisition units.

5. The system of claim 1, comprising:
    a second automated connection and charging magazine provided within the storage and handling system.

6. The system of claim 1, comprising:
    each of the plurality of stacks of seismic data acquisition units comprising a plurality of seismic data acquisition units stacked via cleat rings.

7. The system of claim 1, comprising:
    a top hat structure extension attached to the top hat structure, the top hat structure extension configured to provide gantry robot access to the plurality of containers.

8. The system of claim 1, comprising:
    the automated connection and charging magazine to charge a stack of seismic data acquisition units of the plurality of stacks of seismic data acquisition units, the stack of seismic data acquisition units comprising at least two seismic data acquisition units stacked on one another via cleat rings.

9. The system of claim 1, wherein the automated connection and charging magazine comprises:
a plurality of connection systems; and
a linear drive motor to move a plurality of connectors to connect with a stack of seismic data acquisition units.

10. The system of claim 1, wherein the automated connection and charging magazine comprises:
a connection system; and
a bumper having a conical shape configured to guide the connection system to connect with the first seismic data acquisition unit.

11. The system of claim 1, wherein the automated connection and charging magazine comprises:
a plurality of connection systems;
a plurality of bumpers having a conical shape configured to guide the plurality of connection systems to connect with a stack of seismic data acquisition units; and
a linear drive motor to move the plurality of connection systems to connect with the stack of seismic data acquisition units via the plurality of bumpers.

12. The system of claim 1, wherein:
each of the plurality of connection systems comprising a floating individual connection.

13. The system of claim 1, wherein the automated connection and charging magazine comprises:
a connection system comprising:
a mating connector;
a spring to provide floating motion;
an internal slide containing the mating connector;
a conical shade for initial mating.

14. A method of performing a seismic survey in an aqueous medium, comprising:
storing, by a storage and handling system containing a plurality of containers located on a back deck of a vessel, a plurality of stacks of seismic data acquisition units;
providing, by a top hat structure located in the storage and handling system, wherein the top hat structure comprises one or more rails, structural support for an addition of a second level of the storage and handling system or other equipment such as an ROV and associated LARs for deploying seismic data acquisition units;
providing an automated connection and charging magazine within the storage and handling system, the automated connection and charging magazine comprising a plurality of electronic ports, wherein the one or more rails are located over the storage and handling system and over the automated connection and charging magazine;
providing a gantry robot connected to the top hat structure, via the one or more rails, in the storage and handling system, the gantry robot to move, within a horizontal plane on or above the storage and handling system and via the top hat structure, in a first direction and a second direction perpendicular to the first direction; and
moving, by a robotic arm of the gantry robot to move, in a vertical plane, to engage a first seismic data acquisition unit from the plurality of stacks of seismic data acquisition units at a first location in the storage and handling system; and
moving, by the robotic arm, in the horizontal plane via the gantry robot to place the first seismic data acquisition unit at a second location in the storage and handling system to connect the first seismic data acquisition unit to a first electronic port of the plurality of electronic ports of the automated connection and charging magazine, wherein the automated connection and charging magazine further comprising at least one connection column that includes:
a plurality of connection systems;
a slide on the plurality of connection systems, wherein the slide is coupled to the one or more rails located over the automated connection and charging magazine; and
a plurality of linear drive motors, wherein the plurality of linear driver motors is further configured to move, via the slide, the plurality of connection systems to connect with a stack of seismic data acquisition units of the plurality of stacks of seismic data acquisition units.

15. The method of claim 14, wherein the top hat structure includes one or more members extending from a first side of the storage and handling system to a second side of the storage and handling system.

16. The method of claim 14, comprising:
transporting, by a conveyor, a second seismic data acquisition unit towards an opening of the storage and handling system;
engaging, by the robotic arm of the gantry robot, with the second seismic data acquisition unit on the conveyor; and
placing, by the robotic arm, the second seismic data acquisition unit on a stack of seismic data acquisition units of the plurality of stacks of seismic data acquisition units.

17. The method of claim 14, wherein each of the plurality of stacks of seismic data acquisition units comprises a plurality of seismic data acquisition units stacked via cleat rings.

18. The method of claim 14, wherein a top hat structure extension can be attached to the top hat structure to allow the gantry robot to access the plurality of containers.

19. The method of claim 14, wherein the automated connection and charging magazine comprises a connection system comprising:
a mating connector;
a spring to provide floating motion;
an internal slide containing the mating connector;
a conical shade for initial mating.

* * * * *